Figures 1, 2:
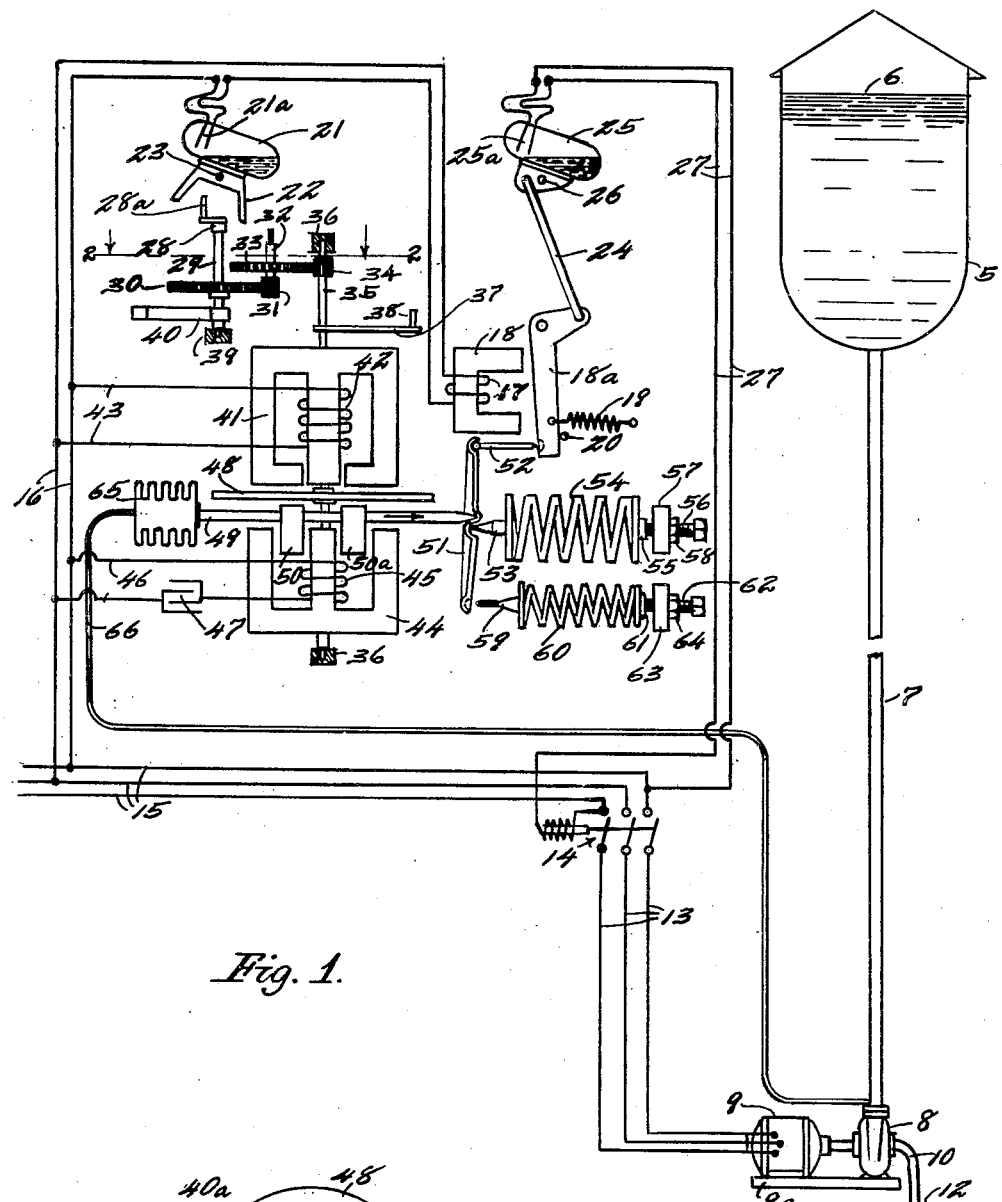

Sept. 11, 1934.   C. J. GARDEEN   1,972,986
PRESSURE GOVERNOR
Filed Sept. 3, 1931

Inventor
By CARL J. GARDEEN
Reif & Spaddock
Attorneys

Patented Sept. 11, 1934

1,972,986

UNITED STATES PATENT OFFICE 1,972,986

PRESSURE GOVERNOR

Carl J. Gardeen, St. Paul, Minn., assignor to Consolidated Electric Company, St. Paul, Minn., a corporation of Minnesota Application September 3, 1931, Serial No. 560,916

24 Claims. (Cl. 103—25)

This invention relates to a device for regulating pressures, or to a pressure governor. While the invention is capable of various applications, one common use is for regulating fluid pressure and particularly for maintaining the pressure in a liquid supply system within certain close limits. This control is usually effected by controlling the operation of the means for producing a pressure which is usually a power driven pump. Such liquid supply systems comprise water supply systems where the water is pumped into a supply tank and it is desired to regulate the level of water in the tank between close limits. A pressure controlled system for water levels and such tanks is desirable for several reasons, among which is the reason that the control apparatus can be located in the pump or power room even though the tank may be a long distance from such pump or power room.

One difficulty encountered in such pressure controlled systems is caused by the surging of the liquid or water which is set up when the pump is stopped or started. It is necessary to have a control device or pressure governor which is sensitive to minute variations in the pressure of liquid and yet which is not affected by the surging of the liquid when the pump starts or stops, or by surges resulting from any other cause.

It is an object of this invention, therefore, to provide a pressure regulating device or pressure governor which is simple and efficient in operation, and very sensitive to small variations in static pressure, but is not affected by pressure surges.

It is a further object of the invention to provide a pressure regulating device or pressure governor in which the variations in the hydraulic pressure operate to vary a magnetic flux which action is used to move a member which makes and breaks an electric circuit.

It is another object of the invention to provide a pressure regulating device in which the variations in pressure are caused to vary a magnetic flux or change a shifting magnetic field and which comprises a member movable in different directions by said magnetic field, and a second member movable to neutral position and to positions at either side of said neutral position for moving said first mentioned member respectively in said different directions, the surging of the liquid merely moving said second member to either side of said neutral position successively and thus having no effect on said first mentioned member.

It is still another object of the invention to provide a pressure regulating device having in combination with means for producing pressure and an electric circuit for actuating said means, a member movable in different directions for opening and closing said circuit, said member being actuated by a shifting magnetic field, a magnetic means movable to neutral position and to either side of neutral position for respectively actuating said member in said different directions, and means responsive to said pressure for moving said last mentioned member.

It is more specifically an object of the invention to provide a pressure regulating device having in combination with a means for producing pressure and an electric circuit for operating said means, a member rotatable in opposite directions for opening and closing said circuit, said member being actuated by a shifting magnetic field, a magnetic means movable to neutral position and to either side of said neutral position for causing movement of said member in said opposite directions respectively, a pressure responsive device for moving said magnetic means in one direction when the pressure attains a certain point, and means for moving said magnetic means in the other direction when said pressure falls to a certain point.

These and other objects and advantages of the invention will be fully set forth in the following description made in connection with the accompanying drawing, in which like reference characters refer to similar parts throughout the several views and in which:—

Fig. 1 is a somewhat diagrammatic view illustrating the device in connection with a motor driven pump and pressure tank; and, Fig. 2 is a horizontal section on line 2—2 of Fig. 1 as indicated by the arrow.

Referring to the drawing, a pressure tank 5 is shown adapted to receive liquid 6 which can be pumped into the tank at various heights and thus causes different pressure or static heads in the supply pipe 7 which is connected to the pump 8 driven by motor 9. Pump 8 and motor 9 are shown as mounted on a base member 9a. The inlet pipe 10 for pump 8 is shown as extending into a supply of liquid 11 in a well 12.

The motor 9 is electrically driven and conductors 13 are shown as extending to the starter 14 from said motor and line conductors 15 extend to said starter 14. A pair of conductors 16 extend from two of the line conductors 15 and are connected to the energizing coil 17 of an electromagnet 18. Said magnet has the usual pivoted armature 18a drawn to open position against stop 20 by the coiled tensile spring 19. One conductor 16 is open and has its separated parts connected to the spaced electrodes 21a of a tilting mercury switch 21 having a fork 22 secured thereto swinging about the pivot 23. The armature 18a is connected by a link 24 to another mercury switch 25 oscillatable about the pivot 26. Spaced electrodes 25a are disposed in the tube of switch 25 and connected respectively to conductors 27 forming the starting circuit for motor 9.

The fork 22 and switch 21 are arranged to be operated by the rotating crank 28, the crank pin 28a of which engages said fork and swings switch 21 so that the mercury therein connects electrodes 21a to close the circuit formed by conductors 16 or to move the switch to the position shown in Fig. 1 when the circuit is open. Crank 28 is carried on a shaft 29 rotated by a comparatively large gear 30, in turn rotated by a pinion 31 secured to shaft 32 to which another large gear 33 is connected. Gear 33 is in turn driven by a pinion 34 secured to a shaft 35. Shaft 35 is journaled in bearings 36 at its top and bottom and carries an arm 37 having an upstanding pin 38 adjacent its end. Shaft 29 is journaled in a bearing 39 and has secured to its lower end a stop member 40 comprising oppositely extending arms having hook portions 40a at their outer ends disposed in opposite directions, said hook portions 40a being in horizontal alinement with the pin 38. A laminated magnetic core 41 is provided, energized by the coil 42 connected at its ends by conductors 43 respectively to the conductors 16. Another laminated magnetic core 44 is provided, having three spaced upstanding arms, a coil 45 being wound on the central arm which has its ends connected by conductors 46 to the conductors 16 respectively. A condenser 47 is disposed in one of the conductors 46 and a disk 48 preferably made of aluminum is secured to shaft 35 and disposed to rotate between the cores 41 and 44. A bar 49 is provided, having secured thereto a pair of pole pieces 50 and 50a disposed respectively between the arms of core 44, said bar 49 being arranged for movement transversely of the axis of shaft 35 so that the pole pieces 50 and 50a can be brought nearer to or farther from the outside arms of the core 44. Bar 49 is shown as extending beyond the core member 44 and a lever 51 is formed to fulcrum on the end of bar 49, said lever being connected to a link 52 at its upper end, which link is arranged to be engaged by the lower end of the armature 18a. A short distance below bar 49 lever 51 engages a rod 53 secured to one end of a coiled compression spring 54. The other end of spring 54 is engaged by a block 55 swiveled on the end of a headed screw 56 threaded into the fixed block 57, said screw being shown as having a jamb nut 58 thereon engaging the block 57. The lower end of lever 51 is adapted to engage a rod 59 secured to one end of a supplemental coiled compression spring 60 the other end of which is engaged by a block 61 swiveled on the end of a headed screw 62, which screw is threaded in a fixed block 63 and has a jamb nut 64 thereon engaging block 63. Bar 49 is connected to a pressure responsive device 65 and while this device might be variously formed to give movement in response to pressure, in the embodiment of the invention illustrated the same is shown as in the form of a bellows. Rod 49 is connected to one end of said bellows and said bellows is connected at its other end by a tube or pipe 66 to the stand pipe or discharge pipe 7 of the pump 8 adjacent the outlet side of said pump.

The circuit through the coil 42 is highly inductive and the current through this coil therefore, and the magnetic flux in core 41 lags nearly ninety degrees behind the voltage in conductor 16. Conductors 16 are as stated connected directly across the conductors 15 through which alternating current or electromotive force is supplied. The coil 45 is also inductive, but the inductive reactance in this coil is approximately counterbalanced by the condensive reactance of condenser 47. The current through the coil 45 is of course determined by the resistance of coil 45 and is approximately in phase with the voltage in conductors 16 or the applied electromotive force. The magnetic flux through the core 44 is also in phase with the current through the coil 45. The instantaneous polarity of pole pieces 50 and 50a relative to the direction of the magnetic flux through cores 41 and 44 depends upon their position relative to the core 44. When their position is midway between the three legs of core 44, the polarity of the pole pieces 50 and 50a is neutral. Moving the pole pieces to the right will cause the pole piece 50a to take up the polarity of the outer legs of core 44 and pole piece 50 to take up the polarity of the center leg or core 44. Moving the bar 49 and pole pieces 50 and 50a to the left will cause the pole piece 50a to take up the polarity of the central leg of core 44 and the pole piece 50 to take up the polarity of the outer legs of core 44. It will thus be seen that the instantaneous polarity of the pole pieces 50 and 50a is reversed by shifting their position from right to left or from one side of central position to the other side of central position. As the fluxes through cores 41 and 44 are approximately 90 degrees apart or at quadrature with each other, a shifting magnetic field is set up through disk 48, causing said disk to rotate if free to do so. When the pole pieces 50 and 50a are in mid-position, they are as stated neutral and there is no turning effect induced in the disk 48. The connections to core 41 and core 44 are such that when the pole pieces 50 and 50a are moved to the right as shown in Fig. 1 the disk 48 and shaft 35 tend to rotate in a clockwise position as indicated by the arrow in Fig. 2, and when bar 49 and pole pieces 50 and 50a are moved to the left as shown in 51, the disk 48 is influenced to move in a counter-clockwise direction.

The gear connections and gear ratio between shafts 35 and 29 is such that both shafts rotate in the same direction and the shaft 35 can make only a certain number of revolutions, which in one practical embodiment of the invention has been about fifty, in either direction before one of the hooked ends 40a of the stop member 40 will engage with the stop pin 38, and stop the rotation of shaft 35. Stop member 40 has been shown out of engagement with pin 38 to more clearly show the same. The shaft 29 makes only a half revolution.

In operation the pump 8 is driven by motor 9 and pumps the water from well 12 into the tank 5. Let it be assumed that it is desired to maintain the water level in tank 5 within certain limits, so that at the lower limit the static head at he so that at the lower limit the static head at the higher limit the static head at the pump discharge will be 102 feet. Let it also be assumed that the friction head in the water connection or pipe 7 between the pump and tank when pump 8 is operated, is 15 feet. When pump 8 is started or stopped, as stated, surges will be set up in the pipe 7 and tank 5 and let it be assumed that these surges cause the pressure to fluctuate so as to be equal to a height of 30 feet plus and minus. This surge, of course, decreases and subsides after several seconds of time.

Assuming that the level of water in the tank 5 is such as to give a static head at the discharge side of the pump of 101 feet, the pump would be idle and the parts in the position shown in Fig. 1, except that stop member 40 would be engaged with pin 38. The spring 54 will be so adjusted that at this head or pressure the pole pieces 50 and 50a are disposed at the right of a position central with the axis of shaft 35 or at the right side of the central position. The magnetic field tends to rotate disk 48 in the direction shown by the arrow in Fig. 2, and as stated, rotation has been stopped by stop member 40 engaging pin 38. As the water level is lowered in tank 5 by consumption and the static head at the pump is reduced to 100 feet, the pressure in the bellows 65 is reduced and overcome by the pressure of spring 54 and this spring acts through lever 51 and moves bar 49 and the pole pieces 50 and 50a to the left of the central position relative to core 44 and when these pole pieces move to the left of this central or neutral position, the magnetic field is changed so that it tends to move disk 48 in a counter clockwise direction. Said disk is thus so rotated, and after rotating 35 or 40 revolutions, shaft 35 rotates shaft 29 through the gears 30, 31, 33 and 34 so that crank 28 is rotated 180 degrees and operates on fork 22 to oscillate mercury switch 21 to its other position, thus connecting electrodes 21a. Soon after this stop member 40 again engages pin 38 and rotation of shaft 35 is prevented. When electrodes 21a are connected, a circuit is closed through conductors 16 to the coil 17 of magnet 18 and this magnet is energized. Armature 18a is attracted and this, through link 24, tilts mercury switch 25 to its closed position. This connects electrodes 25a and closes the circuit through conductors 27 to the starter 14, and motor 9 and pump 8 start the operation. When armature 18a is attracted, it pushes on link 52, swinging the lever 51 so that its lower end engages rod 59 connected to spring 60 and movement of bar 49 to the right is now resisted by both springs 54 and 60. It will now require pressure or effective head of 117 feet or of 102 feet plus the 15 feet friction head to move bar 49 and cause disk 48 to rotate in the opposite direction. When the pump 8 starts and water is delivered therefrom, a surge is set up in the water and this, acting through the bellows 65, causes movement of bar 49 and pole pieces 50 and 50a are reciprocated several times across their central or neutral position. This is caused by the fact that the surge is a plus and minus quantity, so to speak, and causes the pressure to increase and decrease. However, since the pole pieces are moved first to one side and then to the other of the neutral position, no continuous rotating effect is produced on the disk 48 and though it may be oscillated, it does not rotate consistently and as stated comes to rest or remains at rest with the stop member 40 engaged with pin 38. When the surge has ceased, the head at the pump discharge will be 100 feet plus the 15 feet frictional head or 115 feet. As the water level in the tank 5 rises, the effective head at the pump will increase until it reaches 117 feet and at this pressure the bellows 65 which is responsive to the pressure, will move bar 49 and pole pieces 50 and 50a will be moved to the right as shown in Fig. 1 against the pressure of both springs 54 and 60 and when pole pieces 50 and 50a move to the right of neutral position, disk 48 will again be rotated as indicated by the arrow in Fig. 2, shaft 35 will be rotated and shaft 29 and crank 28 will be oscillated so that crank pin 28a will again tilt the mercury switch 21 and disconnect electrodes 21a. This breaks the circuit through magnet 18 and spring 19 will retract armature 18a which will, through the link 24, tilt the mercury switch 25 and separate the electrodes 25a. The circuit is now open through the starter 14 and motor 9 and pump 8 are stopped. When pump 8 is stopped, the surge is again set up in the water and this will again act through bellows 65 to reciprocate pole pieces 50 and 50a across the central or neutral position. This, however, will have no effect on the disk 48 to operate switch 41 and said disk will oscillate several times with the surge, but will then turn sufficiently to come to rest and remain at rest with stop member 40 engaging pin 38. It will be understood that when disk 48 rotates in one direction, pin 38 will engage in one of the stop members 40a and when it rotates in the other direction, pin 38 will engage with the other stop member 40a. The pump 8 will thus be stopped when the level of water in tank 5 reaches the desired point.

The bar 49 and the pole pieces 50 and 50a need only be moved a short distance to the right or the left to cause rotation of disk 48. There is a very small differential of operation therefore, in causing disk 48 to rotate in one direction or the other. This very small differential will, in practice, always be smaller than the differential in the pressure which is to be maintained. In practice, tests have shown that applicant's apparatus will operate reliably with a differential of one and one-half inches of water. In practice it is never attempted to regulate the pressure within any such small limits, the differential of pressures in the regular use being a matter of feet. With the small operation differential the auxiliary spring 60 is provided, so that when it is in operation, the high operating point of the operation differential corresponds with the high operation point of the pressure regulation differential. When the auxiliary spring 60 is not in operation, the low operating point of the operation differential corresponds to the low operating point of the pressure regulation differential. This insures that the pressure producing device, namely the pump 8 will always start when the lower desired limit of pressure is reached, and that the pump will always be stopped when the upper limit of the desired pressure is reached. This has not been so with pressure regulators having a high operating differential such as the spring switches having one spring-pressed position for one pressure, and another position for a higher pressure. In such devices the pressure or level of the water is apt to be such after the surging takes place, that the pressure producing device is not properly controlled. In applicant's device, with a practically negligible operating differential the pressure producing device or pump will be stopped and started positively at the desired point, regardless of the surge.

From the above description it is seen that applicant has provided quite a simple and efficient pressure regulator, one that will control the level or pressure of water within very close limits, and is not affected by the surging of the liquid. The springs 54 and 60 can be adjusted in accordance with the desired or present conditions and when once adjusted, will need no further attention. As stated, the device is compact in construction and can be contained in a small casing. The parts are of simple construction and the device is reliable and very durable. The same has been amply demonstrated in actual practice and found to be very successful and efficient.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:—

1. In a pressure governor, means for varying a magnetic flux by varying the reluctance of the circuit traversed by said magnetic flux in accordance with the pressure to be governed, means for producing said pressure operated from an electric circuit, and means responsive to variations in said magnetic flux for opening and closing said electrical circuit.

2. In a pressure governor, means for producing pressure, means for starting and stopping the operation of said means, means for varying a magnetic flux by varying the reluctance of the circuit traversed by said magnetic flux in accordance with said pressure, and means responsive to variations in said magnetic flux for actuating said second mentioned means.

3. In a pressure governor, means for producing pressure, means for starting and stopping the operation of said means, a member movable in different directions by a shifting magnetic field for controlling said last mentioned means, a magnetic means movable to a neutral position and to positions at either side of said neutral position to move said member in said different directions respectively, and means responsive to said pressure for moving said last mentioned means.

4. A device for maintaining a certain fluid pressure range, comprising means for producing said pressure, means for starting and stopping the operation of said means, means actuated by a magnetic flux for operating said second mentioned means, means actuated when the pressure rises above the high point of said range to vary said magnetic flux by varying the reluctance of the circuit traversed by said magnetic flux and cause said last mentioned means to stop the operation of said first mentioned means, and means actuated when said pressure falls below low point of said range to vary said magnetic flux by varying the reluctance of the circuit traversed by said magnetic flux and cause said second mentioned means to start the operation of said first mentioned means.

5. A pressure regulating device having in combination, means for producing pressure, an electric circuit controlling said means, a member movable in accordance with said pressure, a member varying a shifting magnetic field and movable by said first mentioned member, and a switch actuating member controlled by said shifting magnetic field for opening and closing said electric circuit.

6. A pressure regulating device having in combination, a pressure producing means, an electric circuit for operating said means, a switch controlling said circuit, a member movable by a shifting magnetic field, a switch operating means actuated by movement of said member, magnetic members movable to either side of a neutral position to move said first mentioned member in different directions respectively, and means responsive to the pressure produced by said means for moving said magnetic members whereby surges in said pressure move said magnetic members successively to either side of said neutral position and do not move said first mentioned member to cause it to actuate said switch operating means.

7. A pressure regulating device having in combination, a pressure producing means, an electric circuit controlling said means, a switch for opening and closing said circuit, a member movable in different directions by a shifting magnetic field for operating said switch, magnetic members movable to either side of a neutral position for moving said first mentioned member to said different positions respectively, and means responsive to the pressure produced by said means for moving said last mentioned members and means for varying the action of said last mentioned means.

8. A pressure regulating device having in combination, means for producing fluid pressure, means for starting and stopping the operation of said means, said starting and stopping causing a surging of said fluid, a member movable in different directions by a shifting magnetic field for controlling said last mentioned means, a magnetic means for actuating said last mentioned member movable to a neutral position, where said last mentioned member is not actuated, and to positions at either side of said neutral position to actuate said last mentioned member in said different directions respectively, and a means responsive to said pressure and surging for moving said magnetic means, whereby said surging moves said magnetic means to either side of said neutral position and does not actuate said first mentioned member in a way to cause actuation of said first mentioned means.

9. A pressure regulating device having in combination, means for producing pressure, means for starting and stopping the operation of said means, means movable in different directions by a magnetic field for actuating said second mentioned means, a magnetic means movable to different positions to cause movement of said first mentioned means in said different positions respectively, and means responsive to said pressure for controlling said last mentioned means.

10. A pressure regulating device having in combination, means for producing pressure, an electric circuit for operating said means, a member movable in different directions by a magnetic field for opening and closing said circuit, a magnetic member movable to neutral position and to either side of said neutral position for moving said member in said different directions respectively, means responsve to said pressure for moving said last mentioned member to one side of neutral position, resilient means for moving said member to the other side of neutral position, and means for adjusting said resilient means.

11. A pressure regulating device having in combination, means for producing pressure, an electric circuit controlling said means, a switch for opening and closing said circuit, an electro-magnet for actuating said switch, a second circuit for energizing said magnet, a second switch for opening and closing said second circuit, a member movable in different directions by a shifting magnetic field for actuating said second switch, a member movable to neutral position and movable to either side of neutral position for respectively moving said last mentioned member in said different directions, means responsive to said pressure for moving said last mentioned member in one direction, and resilient means for moving said last mentioned member in the opposite direction.

12. The structure set forth in claim 11, and an additional resilient means resisting the movement of said means responsive to pressure, brought into operative position by said electromagnet.

13. A pressure regulating device having in combination, means for producing pressure, an electric circuit controlling said means, means for opening and closing said circuit, a member rotatable in opposite directions by a magnetic field for actuating said switch, a multiple pole magnet at one side of said member, a member having spaced pole pieces movable relatively to said magnet to vary the polarity of said pole pieces, said last mentioned member being movable to neutral position relatively to said magnet and rotatable member and movable to positions at either side of the neutral position for respectively rotating said member in opposite directions, means responsive to said pressure for moving said last mentioned member to one side of neutral position.

14. A device for regulating the pressure of fluid between upper and lower limits having in combination, means for producing said pressure, an electric circuit for controlling said means, means for opening and closing said circuit, a member movable in different directions by a shifting magnetic field for actuating said last mentioned means, a magnetic member movable to neutral position and to positions at either side of said neutral position for moving said last mentioned member in said different directions respectively, means responsive to said pressure for moving said last mentioned member to one side of neutral position when the upper limit of pressure is reached, and means for moving said last mentioned member to the other side of neutral position when the lower limit of pressure is reached.

15. A device for regulating the pressure of fluid between upper and lower limits having in combination, means for producing pressure, an electric circuit for controlling said means, means for opening and closing said circuit, an electromagnet for actuating said last mentioned means, a second circuit for energizing said electro-magnet, means for opening and closing said second circuit, a member rotatable in opposite directions by a shifting magnetic field for actuating said last mentioned means, a member carrying pole pieces movable to neutral position and to either side of neutral position for shifting said magnetic field and rotating said last mentioned member in said opposite directions respectively, means responsive to said pressure for moving said last mentioned member to one side of neutral position when the upper limit of pressure is reached, and resilient means for moving said last mentioned member to the other side of neutral position when the lower limit of pressure is reached, and means for varying the pressure at which said last mentioned means operates.

16. A device for regulating the pressure of fluid between upper and lower limits having in combination, means for producing pressure, an electric circuit controlling said means, means for opening and closing said circuit, a magnetic core energized by an alternating current to produce a magnetic field, a second magnetic core adjacent said first mentioned magnet energized by alternating current to produce a magnetic field and comprising three spaced core portions, the flux in said cores being of different phase and producing a shifting magnetic field, a member disposed between said magnetic cores and movable in different directions, a member carrying a pair of pole pieces movable to central and neutral position with respect to said second magnetic core and movable to positions at either side of said central and neutral position to vary the polarity of said pole pieces to vary said shifting magnet field and move said first mentioned member in opposite directions respectively, and means responsive to said pressure for moving said last mentioned member.

17. A device for regulating the pressure of fluid between upper and lower limits having in combination, means for producing pressure, an electric circuit for controlling said means, an electro-magnet for opening and closing said circuit, a second circuit for energizing said electro-magnet, a member movable in different directions for opening and closing said second circuit and movable by a shifting magnetic field, a magnetic means movable to neutral position and to either side of neutral position for causing movement of said last mentioned member respectively in different directions, a member responsive to said pressure for moving said last mentioned member to one side of neutral position, means for moving said last mentioned member to the other side of neutral position when said pressure decreases sufficiently, a lever disposed between said last mentioned means and said last mentioned member movable upon energization of said electromagnet, and an auxiliary resilient means engaged by said lever when so moved, and means for adjusting said resilient means.

18. In a pressure governor, means for producing pressure, means for starting and stopping the operation of said means, a member movable in different directions by a shifting magnetic field for controlling said last mentioned means, a magnetic means movable to a neutral position and to positions at either side of said neutral position to move said member in said different directions respectively, means for moving said magnetic means in one direction to cause said member to actuate said second mentioned means to start said first mentioned means, means responsive to said pressure for moving said magnetic means in the opposite direction to cause said member to actuate said second mentioned means to stop the operation of said first mentioned means, and an auxiliary means for resisting movement of said last mentioned means and compensate for the fluid friction.

19. The method of regulating fluid pressure which consists in operating a pressure producing device to create a fluid pressure, creating a shifting magnetic field, and varying said field in accordance with said created pressure to control said pressure producing means.

20. The method of regulating a fluid pressure which consists in operating a pressure producing means by an electric circuit to create a fluid pressure, creating a shifting magnetic field and varying said field in accordance with said created pressure to open and close said circuit to regulate said pressure producing means.

21. A pressure regulating apparatus constructed and arranged to operate in response to pressures having in combination, means for producing pressure, a member movable to different positions for respectively causing an increase or causing a cessation of increase in said pressure, means controlled by said pressure for moving said member to said positions upon a certain differential in said pressure, said means having a small differential of actuation and means including a member brought into and out of operation by said first mentioned member so that when said pressure is not being increased and immediately after it ceases to be increased the low operating point of said first mentioned differential corresponds to the low point of said last mentioned differential and when said pressure is increasing and immediately before it is increased said high operating point of said first differential corresponds to the high point of said last mentioned differential.

22. A pressure regulating apparatus constructed and arranged to operate in response to pressures having in combination, means for producing pressure, a member movable to different positions for respectively increasing or not increasing said pressure, means controlled by said pressure for moving said member to said positions respectively upon the attainment of a certain low point of pressure and a certain high point of pressure and means actuated upon the attainment of said high pressure to render said first mentioned means capable of being actuated when said low point is again attained and actuated when said low point is attained to render said means capable of being actuated only when said high pressure is attained.

23. A pressure regulating apparatus constructed and arranged to act in response to pressures having in combination, means for producing pressure, a member movable to positions to cause an increase of said pressure and to cause a cessation of said increase, a second member movable in one direction to move said first mentioned member into position for causing said increase in said pressure and in another direction to move said first mentioned member to cause said cessation of said increase, means actuated by pressure for moving said second member in one direction, means actuated by pressure for moving said member in said other direction and means for varying said last mentioned means in accordance with the movement of said first mentioned member.

24. A pressure regulating apparatus having in combination, means for producing pressure, means movable to a position to increase said pressure and to a position to cause cessation of said increase respectively at the limits of a certain differential of said pressure, a second means controlling said means movable in different directions and having a smaller differential of operation and means whereby when said pressure is being increased and substantially at the end of said increase the high operating point of said last mentioned differential corresponds with the high point of said first mentioned differential and when said pressure is not being increased the low operating point of said last mentioned differential corresponds with the low operating point of said first mentioned differential.

CARL J. GARDEEN.